US006906863B2

(12) United States Patent
Yoshida et al.

(10) Patent No.: US 6,906,863 B2
(45) Date of Patent: Jun. 14, 2005

(54) LAMP REFLECTOR AND REFLECTOR

(75) Inventors: Hirotaka Yoshida, Sodegaura (JP); Shin Fukuda, Sodegaura (JP); Hiroshi Ishikawa, Sodegaura (JP)

(73) Assignee: Mitsui Chemicals Inc., Tokyo (JP)

( * ) Notice: Subject to any disclaimer, the term of this patent is extended or adjusted under 35 U.S.C. 154(b) by 2 days.

(21) Appl. No.: 10/128,419

(22) Filed: Apr. 24, 2002

(65) Prior Publication Data

US 2002/0196628 A1 Dec. 26, 2002

(30) Foreign Application Priority Data

Apr. 24, 2001 (JP) ....................................... 2001-125262

(51) Int. Cl.[7] .............................. G02B 1/10; F21V 9/00

(52) U.S. Cl. ....................... 359/584; 359/582; 359/585; 362/296

(58) Field of Search ................................ 359/584, 582, 359/585, 583, 577, 580, 360; 362/293, 296

(56) References Cited

U.S. PATENT DOCUMENTS 1,953,796 A 3/1934 Crocker
5,276,600 A 1/1994 Takase et al.
5,612,133 A 3/1997 Mori et al.
5,756,186 A 5/1998 Lievens et al.
5,982,546 A 11/1999 Kawamoto et al.

FOREIGN PATENT DOCUMENTS

DE 44 14 107 A1 10/1994
JP 5-177758 7/1993
JP 8-132555 A 5/1996
JP 9-150482 6/1997
JP 2001133613 5/2001

*Primary Examiner*—Fayez G. Assaf
(74) *Attorney, Agent, or Firm*—Burns, Doane, Swecker & Mathis, L.L.P.

(57) ABSTRACT

An object of the invention is to provide a reflective sheet that uses silver which exhibits a high reflectance as a reflective layer and is excellent in light resistance and wet heat durability, as well as a lamp reflector that uses the sheet and does not generate a luminescent line. The reflective sheet constituted by sequentially arranging at least three layers, that is, an underlying layer, a metal layer made primarily of silver and a protective layer on a polymer film is laminated with a molded body by using an adhesive, allowing a polymer film side of the reflective sheet to be a surface to be adhered, to prepare a reflector. The resultant reflector is processed to prepare a lamp reflector.

12 Claims, 3 Drawing Sheets

LAMP REFLECTOR AND REFLECTOR

BACKGROUND OF THE INVENTION

1. Field of the Invention

The present invention relates to reflectors constituted by laminating silver on polymer films and lamp reflectors using the reflectors and, more particularly, to a reflector having a multi-layer structure primarily constituted by silver which is excellent in light resistance and wet heat durability, and a lamp reflector using the reflector.

2. Description of the Related Art

Heretofore, an aluminum material having a high reflectance, such as an aluminum plate having a mirror-finished surface, an aluminum deposited sheet or the like, has been used as a reflector for a fluorescent lamp or an incandescent lamp. In recent years, the reflector which uses silver having a higher reflectance than aluminum in a visible light region as a reflective layer has been used mainly as a lamp reflector for a backlight of a liquid crystal display device, as well as a reflection umbrella for the fluorescent lamp and the like.

A so-called silver reflective board having a structure of PET (polyethylene terephthalate)/silver thin film layer/adhesive layer/aluminum plate or a so-called silver reflective sheet having a structure of PET/silver thin film layer/white coating/adhesive layer/aluminum deposition layer/polymer film/white coating is subjected to a predetermined processing such as folding processing or the like to be used in such reflectors as described above.

However, there has been a problem in silver that discoloration due to sulfuration and oxidation thereof in an atmosphere, and deterioration of reflectance accompanied therewith occur, as compared with aluminum. To solve the problem, there has been developed a method in which such sulfuration and oxidation of silver caused by being exposed to the atmosphere are prevented by using PET, which is a transparent polymer film, as a protective layer of silver to maintain a high reflectance (Japanese Unexamined Patent Publication JP-A 5-177758 (1993) and JP-A 9-150482 (1997), etc.) Take, for example, reliability of the silver reflective plate. Even in a high temperature (80° C.), neither blackening caused by sulfuration and the like, nor deterioration of reflectance is observed. However, in a high temperature of 80° C., silver is discolored into purple and the reflectance is rapidly deteriorated in a time period of from several hundred to several thousand hours. Further, there is a problem that, in a wet heat resistance test (60° C., 90% relative humidity), a multiplicity of white dots are generated and the reflectance is deteriorated.

Furthermore, there is a problem that, though high luminance can be obtained when the silver reflector is used as a lamp reflector for a sidelight-type backlight in a liquid crystal display device, as the luminance is increased, a luminescent line is generated to degrade a representation quality as a display.

SUMMARY OF THE INVENTION

The problem of the invention is to provide a reflector which uses silver showing a high reflectance in a reflective layer, is excellent in light resistance and wet heat durability and, for example, when used in a backlight device, does not generate a luminescent line, and a lamp reflector using the reflector.

In order to solve the problems, the present inventors have made an intensive study and, as a result, have surprisingly found that the above problems have been solved by laminating a reflector, which is constituted by sequentially arranging three layers, that is, an underlying layer, a silver layer and a transparent oxide layer on a polymer film, with a molded body, allowing a polymer film side of the reflector to be a surface to be adhered, to attain the invention.

The invention provides a lamp reflector, comprising at least a substrate (A) and a reflective layer (100) formed on the substrate (A), the reflective layer (100) including an underlying layer (B), a metal layer (C) made primarily of silver and a protective layer (D) comprising an inorganic substance, the lamp reflector having a total reflectance of 90% or more at a wavelength of 550 nm after being irradiated from a side of the reflective layer by a simulated solar radiation having an irradiation intensity of 500 $mW/cm^2$ at 100° C. for 300 hours.

According to the invention, the lamp reflector having a high reflectance and a high durability can be obtained and, when the lamp reflector is provided in a backlight of, for example, a liquid crystal display device or the like, it is possible to realize a high-quality image having a high luminance in which a luminescent line is not generated.

In the invention it is preferable that the underlying layer (B) is a metal layer comprising a single body of metal selected from the group consisting of: gold, copper, nickel, iron, cobalt, tungsten, molybdenum, tantalum, chromium, indium, manganese, titanium and palladium and/or an alloy made of at least two thereof and having a thickness of from 5 nm to 50 nm and/or a metal salt layer or metal oxide layer having a thickness of from 1 nm to 20 nm.

According to the invention, a sufficient barrier effect can be obtained, agglomeration is not generated when the metal layer made primarily of silver is formed, and adhesiveness between the substrate and the reflective layer is excellent.

In the invention it is preferable that the metal layer (C) made primarily of silver comprises a single body of silver or an alloy made primarily of silver and has a thickness of from 70 nm to 400 nm.

According to the invention, a predetermined reflectance can be realized by the metal layer having a sufficient thickness.

In the invention it is preferable that the protective layer (D) comprising an inorganic substance is a metal layer comprising a single body of metal selected from the group consisting of: gold, copper, nickel, iron, cobalt, tungsten, molybdenum, tantalum, chromium, indium, manganese, titanium and palladium and/or an alloy made of at least two thereof and having a thickness of from 5 nm to 50 nm and/or a transparent oxide layer having a thickness of from 1 nm to 20 nm.

According to the invention, a sufficient barrier effect can be obtained and agglomeration is not generated when the metal layer made primarily of silver is formed.

In the invention it is preferable that a ratio of a sum of thickness of the underlying layer (B) and thickness of the protective layer (D) to thickness of the layer (C) made primarily of silver is 0.005 to 0.3.

According to the invention, the lamp reflector which is low in cost and excellent in moldability and durability can be obtained.

In the invention it is preferable that a surface of the substrate (A) in a side opposite to the reflective layer has an irregular shape.

According to the invention, an improvement of operationality and an enhancement of adhesive strength at the time of laminating the reflective layer with the support or the like can be realized.

In the invention it is preferable that the reflector further comprises a support in the form of a plate or sheet made of a polymer or metal.

According to the present invention, characteristics of high strength, high heat releasability, high electric conductivity and the like can be imparted to the lamp reflector.

In the invention it is preferable that a curvature radius thereof in a side of the reflective layer is 5 mm or less.

According to the invention, moldability of the lamp reflector is excellent and minute processing is possible whereby it is possible to downsize the backlight.

The invention provides a reflector comprising at least a substrate (A) and a reflective layer (100) formed on the substrate (A), the reflective layer (100) including an underlying layer (B), a metal layer (C) made primarily of silver and a protective layer (D2) primarily made of a transparent oxide, the reflector having a total reflectance of 90% or more at a wavelength of 550 nm after being subjected from a side of the reflective layer to a simulated solar radiation having an irradiation intensity of 500 $mW/cm^2$ at 100° C. for 300 hours.

According to the invention, a backlight for use in a liquid crystal display device and the like, having a high reflectance and a high durability, which can realize a high-quality image that is high in luminance and does not generate a luminescent line can be obtained.

In the invention it is preferable that a ratio of a sum of thickness of the underlying layer (B) and thickness of the protective layer (D2) to thickness of the layer (C) made primarily of silver is 0.005 to 0.3.

According to the invention, the reflector which is low in cost and excellent in moldability and durability can be obtained.

In the invention it is preferable that the protective layer (D2) is a layer of a member selected from the group consisting of: zinc oxide doped with 5% by weight or less of aluminum oxide and zinc oxide doped with 10% by weight or less of gallium, and has a thickness of from 1 nm to 20 nm.

According to the invention, a sufficient barrier effect can be obtained and agglomeration is not generated when the metal layer made primarily of silver is formed.

By using the reflective sheet according to the invention, even when the reflector is used under sever conditions for a long period of time, the reflector that has a higher reflectance than an aluminum plate having a high luminance and does not deteriorate reflectance can be obtained. Further, by using a film a rear surface of which is mat finished, adhesive strength can be enhanced whereby a stable reflector can be obtained.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
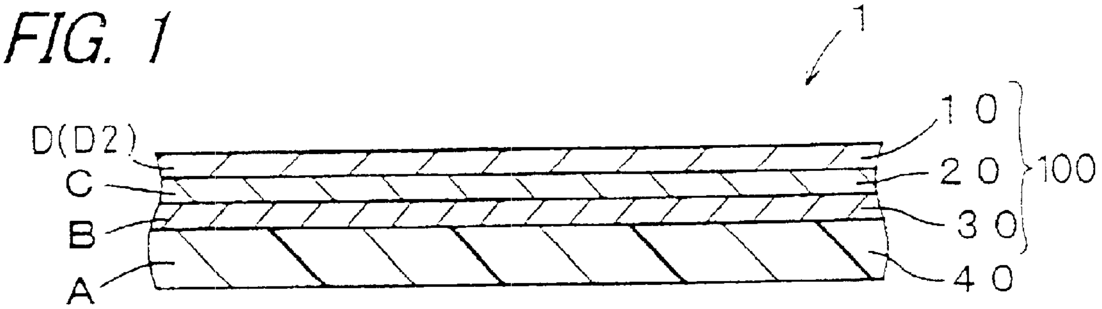
FIG. 1 is a cross-sectional view of a reflector which is an embodiment according to the invention.

Now referring to the drawings, preferred embodiments of the invention are described below.

FIG. 1 is a cross-sectional view of a reflector 1 which is an embodiment according to the invention. Further, a protective layer comprising an inorganic substance may hereinafter be referred to simply as a protective layer.

The reflector 1 according to the invention comprises a reflective layer 100 and a substrate 40. The reflective layer 100 comprises a protective layer 10, a metal layer 20 made primarily of silver and an underlying layer 30.

Figure 2:
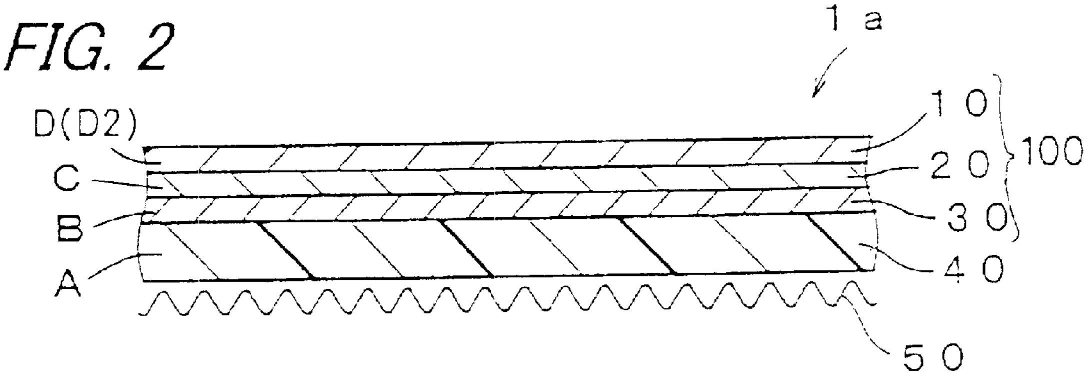
FIG. 2 is a cross-sectional view of a reflector which is another embodiment according to the invention.

FIG. 2 is a cross-sectional view of a reflector 1*a* which is another embodiment according to the invention.

The reflector 1*a* according to the invention comprises the reflective layer 100, the substrate 40 and a mat finished layer 50. The reflective layer 100 comprises the protective layer 10, a metal layer 20 made primarily of silver and the underlying layer 30. The mat finished layer 50 is formed on a surface of the substrate in a side opposite to the reflective layer 100.

Figure 3:
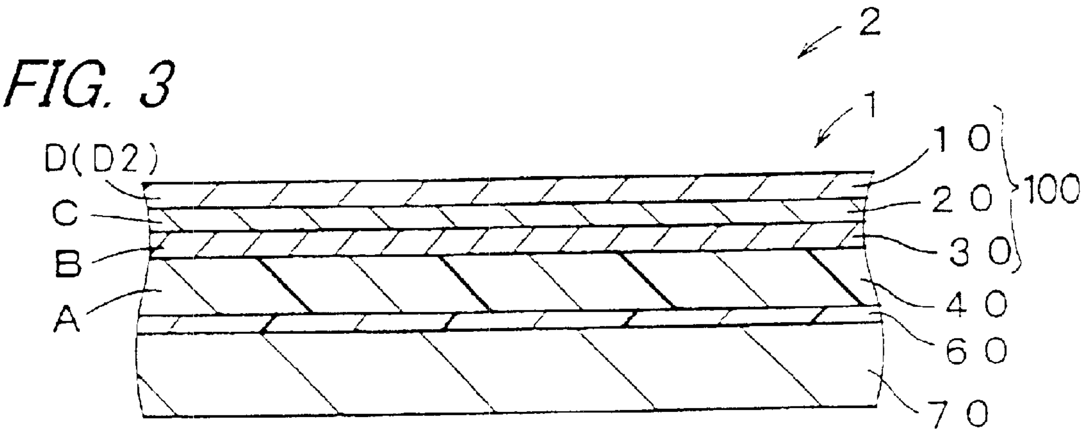
FIG. 3 is a cross-sectional view of a lamp reflector which is an embodiment according to the invention.

FIG. 3 is a cross-sectional view of a lamp reflector 2 which is an embodiment according to the invention;

In the lamp reflector 2 according to the invention, for example, a surface of the reflector 1 shown in FIG. 1 in a side of the substrate 40 and a support 70 are laminated with each other via an adhesive layer 60.

Figure 4:
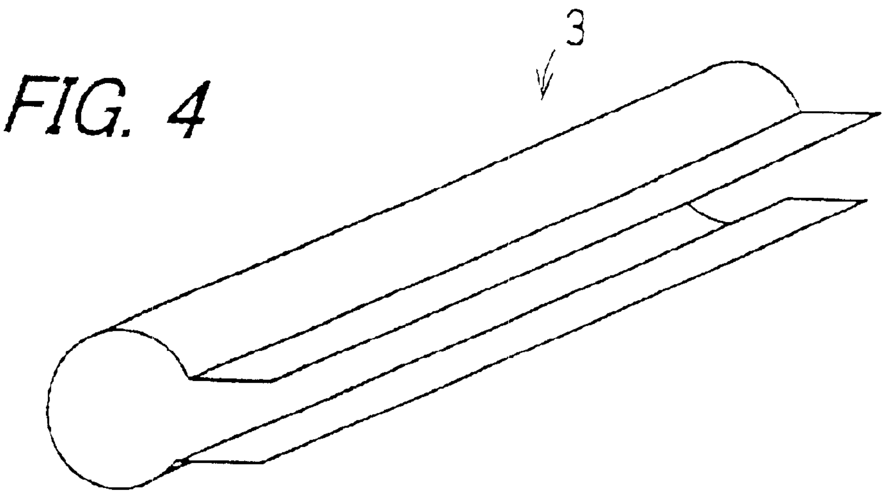
FIG. 4 is a perspective view of a lamp reflector which is another embodiment according to the invention.

FIG. 4 is a perspective view of a lamp reflector 3 which is another embodiment according to the invention.

The lamp reflector 3 according to the invention is formed by subjecting such a lamp reflector 2 as shown in FIG. 3 to folding processing or the like.

Figure 5:
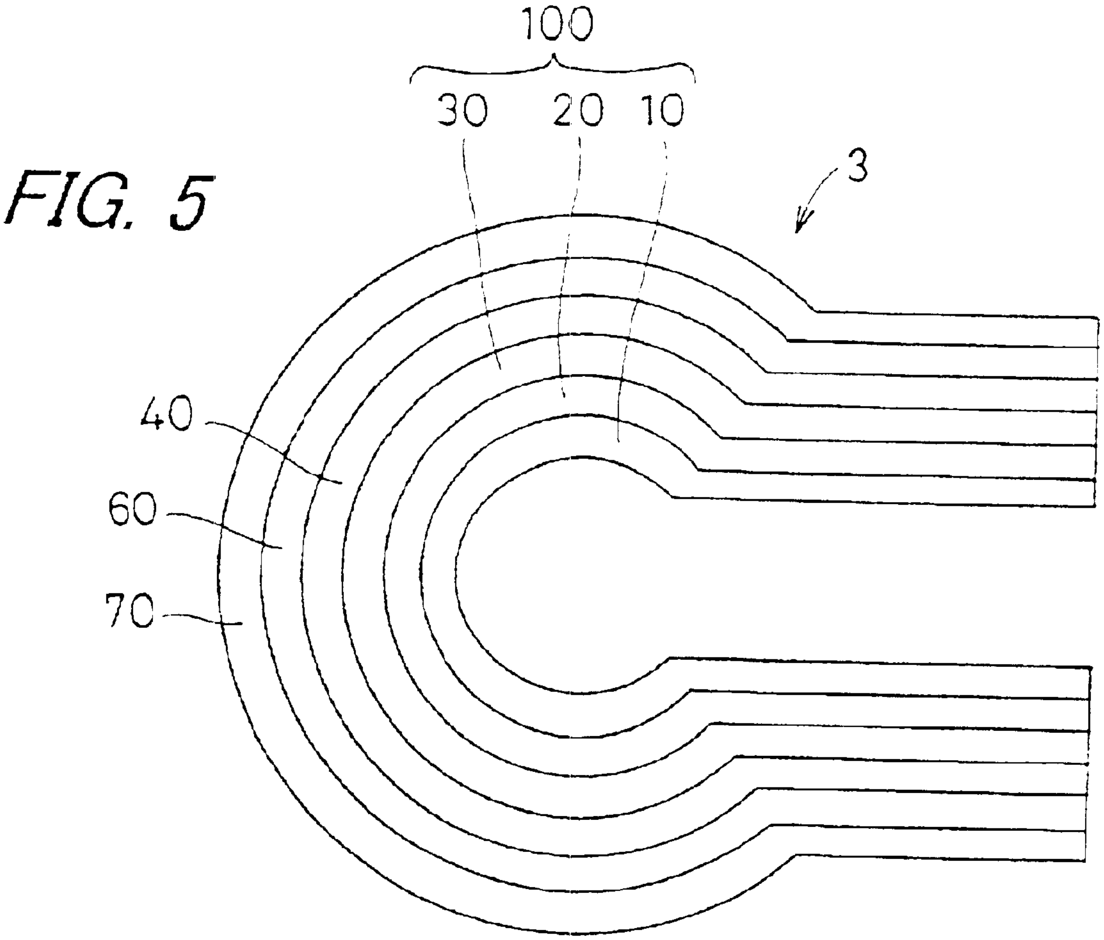
FIG. 5 is a cross-sectional view perpendicular to the axis of a lamp reflector as shown in FIG. 4.

FIG. 5 is a cross-sectional view perpendicular to the axis of the lamp reflector 3 as shown in FIG. 4;

The lamp reflector 3 according to the invention is processed such that the reflective layer 100 comprising the protective layer 10, the metal layer 20 made primarily of silver and the underlying layer 30 is allowed to be inside to face a lamp.

Figure 6:
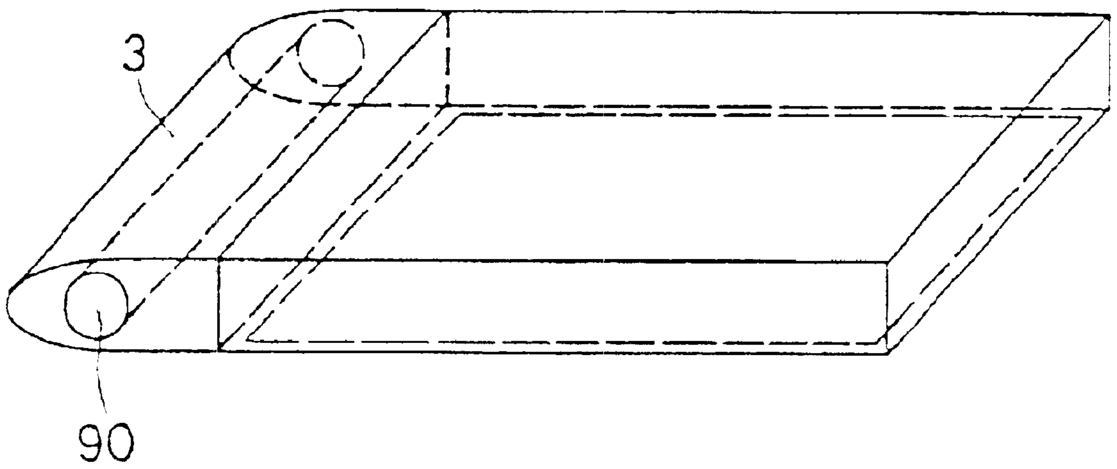
FIG. 6 is a perspective view of a sidelight-type backlight using a lamp reflector which is another embodiment according to the invention.

FIG. 6 is a perspective view of a sidelight-type backlight using the lamp reflector 3 which is another embodiment of the invention.

The lamp reflector 3 of the invention is arranged in a side surface of the backlight in a state of wrapping a lamp 90.

The invention will be described in detail below.

As the substrate (A) according to the invention, not only metal such as aluminum, brass, stainless steel, steel and the like, a plate, a sheet, a film and the like made of ceramic, a polymer and the like, but also a tackifier sheet, an adhesive sheet and the like are used.

Among other things, preferable is the polymer film which has a high degree of freedom of shapes and can adopt a roll-to-roll process when, for example, the metal layer 20 is formed.

As polymer films which are favorably used in the reflector 1 according to the invention, mentioned are films made of various types of plastics which include, for example, polyesters such as polyethylene terephthalate (PET), polyethylene naphthalate and the like, polycarbonates such as bisphenol A-type polycarbonate and the like, polyolefins such as polyethylene, polypropylene, a cyclic olefin copolymer, an ethylene-vinyl acetate copolymer and the like, cellulose derivatives such as cellulose triacetate and the like, vinyl-type resins such as polyvinylidene chloride, polyvinyl butyrals and the like, polystyrenes, polyimides, polyamides such as nylon, polyether sulfone, polysulfone-type resins, polyacrylate-type resins, fluorine-type resins, polyether ether ketones, polyurethanes, polyacrylic acid, polyacrylic esters, polymethacrylic acid, polymethacrylates, nitriles such as polyacrylonitrile, polymethacrylonitrile and the like, polyethers such as polyethylene oxide and the like, epoxy resins, polyvinyl alcohols, polyacetals such as poval and the like. However, polymer films are not necessarily limited to the above-mentioned members, but other polymer films can be used so long as a crystallization temperature and a glass transition point thereof is higher than a room temperature and a surface thereof is flat and smooth. Among other things, polyesters such as polyethylene terephthalate and the like, polycarbonates and polyamides are preferable.

Thickness of the polymer film to be used is ordinarily in a range of from 1 $\mu$m to 250 $\mu$m, preferably from 5 $\mu$m to 200 $\mu$m and particularly preferably from 10 $\mu$m to 200 $\mu$m. Tensile modulus or flexural modulus thereof is ordinarily 100 MPa or more, preferably 500 MPa or more, more preferably 800 MPa or more and particularly preferably 1000 MPa or more.

The tackifier sheet which can be used as a substrate according to the invention is not particularly limited so long as the sheet is stable when the underlying layer to be described below, the layer made primarily of silver, a protective layer and the like are formed. Specifically, used therein are rubber-type tackifiers, acrylic tackifiers, silicone-type tackifiers, vinyl-type tackifiers and the like. Among other things, acrylic tackifiers have widely been used, due to a low price thereof.

The adhesive sheet which can be used as a substrate according to the invention is not particularly limited so long as the sheet is stable when the underlying layer to be described below, the layer made primarily of silver, a protective layer and the like are formed. Specifically, used therein are silicone-type adhesives, polyester-type adhesives, acrylic adhesives and the like. It is preferable that these adhesives are of hot-melt type.

The above-described substrates may be used in a combination of two types or more for the purpose of obtaining a favorable balance or the like among strength, toughness and adhesiveness of the reflective layer to be described below. Such a combination may be exerted either before or after the reflective layer to be described below is formed.

The substrate according to the invention may be subjected to a surface treatment for the purpose of facilitating formation of the underlying layer (B) to be described below, enhancing surface smoothness thereof or the like. Specifically, a corona discharge treatment or a glow discharge treatment, or resin coating and the like are mentioned. Examples of coating resins include acrylic resins such as polymethyl methacrylate, polyacrylonitrile resins, polymethacrylonitrile resins, silicon resins such as polymers obtained from ethyl silicate, fluorine-type resins, polyester-type resins, polystyrene resins, acetate-type resins, polyethersulfone-type resins, polycarbonate resins, polyamide-type resins, polyimide-type resins, polyolefin-type resins, polyurethane-type resins, urea resins, melamine resins, epoxy resins or mixtures thereof.

In the reflector 100 according to the invention, the reflective layer comprises at least three layers, that is, the underlying layer (B), the metal layer (C) made primarily of silver and a protective layer (D). On this occasion, the reflective layer may have three layers or more, for example, such a multi-layer structure comprising three layers or more as a combination of (B) (C) (D) (C) (D), (B) (C) (D) (C) (B) (C) (D) or the like, so long as a first layer at a side of the substrate is the underlying layer (B) and an outermost layer is the protective layer (D). Though a multi-layer constitution of three layers or more may be permitted, since production efficiency tends to be deteriorated with a number of layers, the number of layers is in a range of preferably from 3 layers to 20 layers and more preferably from 3 layers to 15 layers.

As a favorable example of the underlying layer (B), a metal layer or a metal salt layer or a metal oxide layer made of any of other metals than silver can be mentioned. Specifically illustrated are single bodies of metals such as gold, copper, nickel, iron, cobalt, tungsten, molybdenum, tantalum, chromium, indium, manganese, titanium, palladium, zirconium, bismuth, tin, zinc, antimony, cerium, neodymium, lanthanum, thorium, magnesium, gallium or the like or an alloy made of two or more types of these metals, an oxide of such metal as indium, titanium, zirconium, bismuth, tin, zinc, antimony, tantalum, cerium, neodymium, lanthanum, thorium, magnesium, gallium or the like, mixtures thereof, a metallic compound such as zinc sulfide, magnesium fluoride or the like. Among other things, single bodes of metals, that is, gold, copper, nickel, iron, cobalt, tungsten, molybdenum, tantalum, chromium, indium, manganese, titanium and palladium, alloys made of two or more types of these metals, zinc oxide, indium oxide, tin oxide, and are preferable; zinc oxide doped with 5% by weight or less of aluminum oxide, zinc oxide doped with 10% by weight or less of gallium and an indium-tin oxide (ITO) are more preferable; zinc oxide doped with 5% by weight or less of aluminum oxide or zinc oxide doped with 10% by weight or less of gallium are particularly preferable. Further, a combination of two types or more of these metals, metal oxides, metallic compounds, and metal-doped metals can be used and, furthermore, these metals, metal oxides, metallic compounds, and metal-doped metals can be used in a state of multi-layer structure.

In the metal layer (C) made primarily of silver, a single body of silver, silver containing as an impurity a small quantity of gold, copper, nickel, iron, cobalt, tungsten, molybdenum, tantalum, chromium, indium, neodymium, manganese, titanium, palladium or the like, or an alloy made primarily of silver are preferably used. Though a content of the impurity differs depending on types of metals, the content is from 0.002% by weight to 8% by weight, preferably from 0.004% by weight to 5% by weight and particularly preferably from 0.005% by weight to 4% by weight.

In the protective layer (D), not only same metals and oxides thereof as in the underlying layer (B), but also a combination of two types or more of members selected from the group consisting of: these metals, oxides thereof and alloys made primarily of silver can be used; further, these metals, oxides thereof or the combination can be used in a state of multi-layer structure.

Among other things, metal oxides, preferably oxides of metals such as indium, titanium, zirconium, bismuth, tin, zinc, antimony, tantalum, cerium, neodymium, lanthanum, thorium, magnesium, gallium, silicon and the like, more preferably transparent oxides (D2), that is, oxides of metals such as indium, titanium, zirconium, bismuth, tin, antimony, tantalum, cerium, neodymium, lanthanum, thorium, magnesium, aluminum, silicon, zinc, gallium and the like, and still more preferably an oxide of metal selected from the group consisting of: zinc, indium, and tin. These oxides may include the impurities at a rate of 10% by weight or less for the purpose of imparting other properties so long as the content of the impurity is within a range which does not impair the object of the invention. Further, a combination of two types or more of these oxides may be used. As particularly preferable examples, mentioned are zinc oxide doped with 5% by weight or less of aluminum oxide, zinc oxide doped with 10% by weight or less of gallium, or the indium-tin oxide (ITO).

As a forming method of a metal thin film layer of each of the underlying layer (B), the metal layer (C) made primarily of silver, and the protective layer (D), there are a wet method and a dry method. The wet method is a generic designation of a plating process and is a method of depositing a metal from a solution to form a film. As specific examples, there are a silver mirror reaction and the like. On the other hand, the dry method is a generic designation of vacuum film forming process and, as specific illustrations of the dry method, there are a resistance heating-type vacuum deposition method, an electron beam heating-type vacuum deposition method, an ion plating method, an ion beam assist vacuum deposition method, a sputtering method and the like. Among other things, according to the invention, a vacuum film-forming method which allows for a roll-to-roll method capable of continuously forming a film is preferably used.

When the reflective layer of the reflector according to the invention is produced by the vacuum deposition method, an apparatus in which three sputtering devices are connected with one another is ordinarily preferably used. However, when the underlying layer and the protective layer are formed by a same chemical compound, a desired reflector can be obtained by an apparatus in which two sputtering devices are only connected with each other under a condition that a rotation of a roll is reversed in the middle of such formation.

In the vacuum deposition method, a starting material of metal is first melted by an electron beam, resistance heating, induction heating or the like to raise vapor pressure and, then, evaporated on a surface of a substrate preferably at 13.3 mPa (0.1 mtorr) or less. In this case, a gas such as an argon gas maybe introduced at 13.3 mPa or more to generate a glow discharge of radio frequency or direct current. On this occasion, an initial pressure is preferably as low as possible, specifically 20 mPa or less, and more preferably from 7 mPa to 0.1 mPa.

Examples of sputtering methods include a DC magnetron sputtering method, an RF magnetron sputtering method, an ion-beam sputtering method, an ECR sputtering method, a conventional RF sputtering method, a conventional DC sputtering method or the like.

In the sputtering method, a plate target made of a metal may be used as a starting material, and helium, neon, argon, krypton, xenon, or the like is used as a sputtering gas; on this occasion, among these gases, argon is preferably used. A purity of the gas to be used is preferably 99% or more, and more preferably 99.5% or more. Further, in forming the transparent oxide film, the vacuum film forming method is favorably used. The sputtering method is primarily used; on this occasion, helium, neon, argon, krypton, xenon or the like is used as the sputtering gas and, depending on circumstances, oxygen gas may also be used.

Thickness of the thin film to be formed on the substrate is determined such that the light transmittance to be constituted is allowed to be less than 1% when the reflector 1 is constituted.

Thickness of an underlying layer (B) is preferably from 5 nm to 50 nm, and more preferably from 5 nm to 30 nm, when the metal layer is used. When the thickness thereof is less than 5 nm, a desired barrier effect can not be obtained and there is a case in which an agglomeration may be generated in a metal layer (C) made primarily of silver. Further, even when the thickness thereof is over 50 nm, there is found no change in effectiveness thereof. On the other hand, when a metal salt or metal oxide is used, thickness of the metal salt or metal oxide layer is preferably from 1 nm to 20 nm, and more preferably from 5 nm to 10 nm. When thickness of the metal salt or metal oxide layer is less than 1 nm, a desired barrier effect can not be obtained and an agglomeration is generated in the metal layer (C) made primarily of silver. Even when the thickness thereof is more than 20 nm, there is found no change in effectiveness thereof.

Thickness of the metal layer (C) made primarily of silver is preferably from 70 nm to 400 nm, more preferably from 100 nm to 300 nm, and still more preferably from 130 nm to 250 nm. When the thickness of the metal layer (C) made primarily of silver is less than 70 nm, there is a case in which a desired reflectance can not be obtained, since a metal layer is insufficiently formed. Further, even when the thickness thereof is more than 400 nm, there is found no change in effectiveness thereof.

Thickness of a protective layer (D) is preferably from 5 nm to 50 nm, and more preferably from 5 nm to 30 nm, when the metal layer is used. When the thickness thereof is less than 5 nm, a desired barrier effect can not be obtained and there is a case in which an agglomeration may be generated in the metal layer (C) made primarily of silver. Further, even when the thickness thereof is more than 50 nm, there is found no change in effectiveness thereof. Furthermore, when the transparent oxide is used, the thickness thereof is preferably from 1 nm to 20 nm, and more preferably from 5 nm to 10 nm. When the thickness of the transparent oxide layer is less than 1 nm, a desired barrier effect can not be obtained and an agglomeration is generated in the metal layer (C) made primarily of silver. Further, even when the thickness thereof is more than 20 nm, there is found no change in effectiveness thereof.

In the lamp reflector according to the invention, a ratio of a sum of the thickness of the underlying layer (B) and the thickness of the protective layer (D) to the thickness of the metal layer (C) made primarily of silver is 0.005 to 0.3, preferably 0.01 to 0.25, more preferably 0.01 to 0.2, and particularly preferably 0.02 to 0.2.

When the underlying layer or protective layer is too thick compared with the layer made primarily of silver, not only a production cost is high, but also there are sometimes generated problems such as deterioration of durability, or peeling caused by breakage of the reflective layer derived from an influence of an inner stress thereof, a change of a reflected color, deterioration of bending workability to be described below and the like.

As methods for measuring the film thickness of the respective layers described above, there are methods using a stylus roughness tester, a multiple-beam interferometer, a microbalance, a quarz oscillator method or the like; among other things, the quarz oscillator method is particularly appropriate for obtaining a desired film thickness, since it can measure a film thickness while a film is being formed.

Further, there is a method in which film forming conditions are preliminarily set, the film is formed on a sample substrate under the thus-set conditions, a relationship between a film forming time and a film thickness is determined and, then, the film thickness is controlled by the film forming time.

Reflectance of the thus-produced reflector to be measured from a side of the metal reflective layer is typically 90% or more relative to a light having a wavelength of 550 nm, more preferably 92% or more and still more preferably 94% or more.

The reflector according to the invention is high in durability, for example, even after the reflector is irradiated from a side of the reflective layer by a simulated solar radiation having an irradiation intensity of 500 mW/cm$^2$ at 100° C. for 300 hours, a high photothermal degradation resistance is shown such that a total reflectance at a wavelength of 550 nm is as high as 90% or more. The simulated solar radiation here in used refers to a light which has a similar spectrum as that of a solar radiation at the time of fine weather in the open door. Specifically, a simulated solar spectrum is obtained by combining a xenon lamp with an optical filter. The temperature is controlled by a device in which a thermocouple arranged on an aluminum plate holding a sample and a plate heater are connected to a temperature controller.

As another method of evaluating durability according to the invention, a hydrogen sulfide exposure test can also be adopted. This test is conducted by the steps of putting a part of the reflector cut in a shape of a square having a side of 5 cm long in a sealed container, adding hydrogen sulfide into the container such that a concentration thereof becomes 30 ppm and standing the container added with hydrogen sulfide still at room temperature for 24 hours. In the reflector according to the invention, no blackening or the like is found, 90% or more of reflectance is shown after the reflector is subjected to the hydrogen sulfide exposure test; hence, the reflector according to the invention has a high durability against hydrogen sulfide.

As still another method of evaluating durability according to the invention, a high temperature and high humidity test can also be adopted. This test is conducted by the steps of putting a part of the reflector cut in a shape of a square having a side of 5 cm long in a thermo-hygrostat having a temperature of 60° C. and relative humidity of 90% and standing the part of the reflector therein still for 500 hours. In the reflector according to the invention, after the reflector is subjected to the high temperature and high humidity test, no blackening or the like is generated, 90% or more of reflectance is shown, and peeling is not generated at all by a cross-cut peeling test.

Optionally, a benzotriazole-type or acrylic transparent resin or other organic substances may be coated on the reflector. On this occasion, the wet method is primarily used and thickness thereof is from 0.1 $\mu$m to 100 $\mu$m, and preferably from 0.5 $\mu$m to 50$\mu$m.

Though the reflector according to the invention can be obtained by, for example, the roll-to-roll process, the cut-sheet process or the like, it is preferable to produce the reflector by the roll-to-roll process which is high in productivity.

Though the reflector according to the invention can be obtained in a rolled form, cut-sheet form or the like, it is preferable to obtain the reflector in the roll form from the above-described reasons.

The lamp reflector according to the invention can be obtained by carrying out forming processing of the reflector described above and, preferably, comprises the reflector and a support.

In the support according to the invention, a plate or sheet made of metal or a polymer is used. Examples of metals to be used include aluminum, an aluminum alloy, stainless steel, a copper-zinc alloy, steel or the like. These metals have respective advantages and are each individually used in such a manner as described below. Aluminum is light in weight and excellent in machinability. Since aluminum has a high thermal conductivity and can easily release heat to be applied thereon into an atmosphere, aluminum is favorably utilized in the reflector for a backlight in an LCD in which the reflector is heated by lamp luminescence. The aluminum alloy is light in weight and high in mechanical strength. Stainless steel has an appropriate mechanical strength and is excellent in corrosion resistance. The copper-zinc alloy, for example, brass, is not only high in a mechanical strength, but also easily soldered thereby facilitating attachment of an electrical terminal. Since steel is low in price, steel is favorably used when it is necessary to suppress a cost. Further, when a shape-memory alloy is used, there is a merit of having an excellent processability or the like.

A plastic plate or sheet can also be used. Examples of materials to be used therein include homopolymers or copolymers such as biaxially-oriented polypropylene, polyethylene terephthalate (PET), polyethylene naphthalate (PEN), polybutylene terephthalate (PBT), acrylic resins, methacrylic resins, polyether sulfones (PES), polyether ether ketones (PEEK), polyacrylates, polyetherimides, polyimides and the like. Particularly preferably, a polyethylene terephthalate film is used. When this polymer film is used as an outermost layer, that of white color is preferred from a reason of an outward appearance. These materials are characterized in that weight saving can ordinarily be aimed for compared with metals. There is a preference in that thickness of the polymer film or sheet is rather small from the standpoints of cost saving and easiness of a bending operation while thickness of the polymer film or sheet is rather large from the standpoints of handling performance at the time of laminating with the reflector 1 and a shape-holding property. The thickness of the film is preferably from 5 $\mu$m to 500 $\mu$m, more preferably from 10 $\mu$m to 200 $\mu$m, and still more preferably from 15 $\mu$m to 100 $\mu$m. Further, when the substrate of the reflector is made of a same material as that of the support, there is a case in which the support is not necessitated. Furthermore, when it is difficult to perform folding processing to be described below, such a difficulty can be solved by using a shape-memory resin such as a cyclic olefin polymer or the like.

The reflector is laminated with each other such that a surface of the reflector in a side of the substrate is fixed to the support which is a corrugated molded body by, preferably, a tackifier or an adhesive; on this occasion, the adhesive is particularly preferably used.

Illustrative examples of the tackifiers includes a rubber-type tackifier, an acrylic tackifier, a silicone-type tackifier, a vinyl-type tackifier and the like. Among other things, the acrylic tackifier is widely used, due to a low cost thereof.

The adhesive to be used is a type of the adhesive which performs adhesion by the help of heat or a catalyst. Examples of the adhesives to be used include ordinary adhesives such as a silicone-type adhesive, a polyester-type adhesive, an epoxy-type adhesive, a cyanoacrylate-type adhesive, an acrylic adhesive and the like. Since the epoxy-type adhesive is excellent in strength and thermal resistance, the epoxy-type adhesive can also favorably be used. Since the cyanoacrylate-type adhesive is excellent in a fast-acting property and strength, it can be utilized in efficiently producing a reflector. These adhesives are broadly classified into three categories, that is, a thermal hardening type, a hot-melt type, and a two-component type; on this occasion, the thermal hardening type or the hot-melt type which allows for a continuous production is preferably used. Even when any of the adhesives is used, thickness of the adhesive is preferably from 0.5 $\mu$m to 50 $\mu$m.

The substrate and the support are laminated with each other by the roll-to-roll process or a roll-to-sheet process which use a laminator to obtain a product in a roll or cut-sheet form. When, for example, the adhesive is used, such lamination as described above is executed by the steps of coating the adhesive to a surface of the reflector in a side of the substrate, drying the thus-coated reflector, and laminating the resultant reflector with a molded body in a plate shape by a roll in this order.

As coating methods of adhesives, there are a multitude of methods depending on types of substrates and adhesives; however, those which are widely used are a gravure coater method and a reverse coater method. In the gravure coater method, a gravure coater a portion of which is dipped in the adhesive is rotated where upon a coating operation is performed by allowing a film sent by a backup roll to contact the gravure roll on which the adhesive is attached. A quantity of coating can be adjusted by controlling a number of revolutions of the rolls, and a viscosity of the adhesive. The reverse coater method is similar to the gravure coater method, a quantity of the adhesive to be attached to a coating roll is adjusted by a metering roll arranged in contact therewith.

When a lamination operation is performed, optionally heat may be provided. Further, heat processing may be added so as to obtain a necessary adhesive strength. A temperature at which the lamination operation is performed is from 0° C. to 200° C., preferably from 10° C. to 150° C., and more preferably from 20° C. to 120° C. A temperature of the heat processing is from 30° C. to 250° C., and preferably from 50° C. to 200° C. under the conditions of the above-described laminating temperatures. Further, a wrapping angle around a roll is preferably from 10 degrees to 180 degrees.

It is preferable that adhesive strength between the substrate and the support is 100 g/cm or more when measured by a 90 degree peel test. When this level of adhesive strength is not attained, there is sometimes an unfavorable case in which a deformation or the like may possibly be brought about by separation of the reflector from the corrugated molded body or the like.

There are many cases in which, when the tackifier or adhesive is prepared, a solvent is used. When the solvent remains therein even after such a lamination is executed, a peeling phenomenon is likely to occur or deterioration of the reflective layer (deterioration of durability) is brought about with time, or when the resultant laminate is used after being combined with the backlight, there is a risk of causing deterioration of other members.

A quantity of residual solvent is preferably 0.5 g/cm$^2$ or less and more preferably 0.1 g/cm$^2$, though differing in accordance with types of solvents.

Further, it is preferable that a surface of the reflector according to the invention in a side opposite to the reflective layer has a shape of mountains and valleys. Height of a tip of the mountain from a bottom of the valley on the surface is 0.1 $\mu$m or more, preferably 0.3 $\mu$m or more, and more preferably from 0.5 $\mu$m to 30 $\mu$m. By forming such shape of mountains and valleys, there are cases in which operationality is improved, the adhesive strength is enhanced and the like.

As methods of mat finishing, there are a method in which a surface of the polymer film is subjected to embossing processing thereby forming a mountain-and-valley structure thereon, a sandblast method in which particles of $SiO_2$ or the like is forcibly sprayed on a surface of the polymer film together with a high pressure air, a chemical method such as etching or the like, a method of coating with particles and the like; on this occasion, an appropriate method is selected from thereamong in accordance with required shapes.

The reflector and the lamp reflector according to the invention can be protected from getting scared or being attached with a foreign substance by optionally laminating a protective film while the reflector and the lamp reflector are stored before put in use as a product. The protective film comprises ordinarily a substrate film and a tackifier layer. As substrate films, used are general-purpose films made of, for example, olefin-type copolymers such as low-density polyethylene, linear low-density polyethylene, polypropylene, ethylene-vinyl acetate copolymer and the like, polyesters such as PET and the like. There are many cases in which the reflector and the lamp reflector according to the invention are subjected to molding processing to be described below while they are laminated with a protective film; on this occasion, it is preferable that the protective film is excellent in strength and elongation whereupon specifically low-density polyethylene and linear low-density polyethylene are favorably used.

The tackifiers are not particularly limited so long as deterioration or peeling of the reflective layer, or peeling of the protective film with time is not generated and, further, the protective film is easily peeled off when it is actually removed; specifically illustrated are the rubber-type tackifiers, the acrylic tackifiers, the silicone-type tackifiers, the vinyl-type tackifiers and the like.

Representative evaluation methods for a constitution and electric characteristics of the reflector according to the invention will be described below. Thickness of each of a silver thin film layer, an adhesive layer and a molded body in a plate shape can directly be measured by observing each of cross-sectional surfaces thereof by using a transmission electron microscope (TEM). An analysis of the polymer film of the substrate and the support can be performed by using an infrared spectroscopy (IR) while an analysis of metal and the like of the silver thin film, the substrate and the support can be preformed by using an X-ray fluorescence spectroscopy (XRF), an Auger electron spectroscopy (AES) and the like. Further, an electron probe microanalyzer (EPMA) can perform an elemental analysis in a finer portion than that for the X-ray fluorescence spectroscopy. With reference to the tackifier or the adhesive, the reflector and the support are forcibly separated from each other to allow the tackifier or the adhesive to be exposed and, then, the thus-exposed tackifier of adhesive is dissolved and collected in an appropriate solvent and, thereafter, the thus-collected tackifier or adhesive is subjected to measurement by the infrared spectroscopy (IR) to obtain information concerning a structure thereof.

Further, thickness thereof can be determined by performing a chemical composition analysis and obtaining a depth profile by using the Auger electron spectroscopy (AES) and a secondary ion mass spectroscopy (SIMS).

Since the lamp reflector according to the invention is excellent in reflectance, durability and moldability, the lamp reflector can advantageously be used as a lamp reflector for the backlight used in the liquid crystal display device thereby providing a beautiful image having a high luminance. It is preferable that the lamp reflector according to the invention is manufactured by the steps of subjecting a reflector structure comprising the reflector according to the invention and the support optionally laminated thereto to blanking processing to be in a predetermined shape and subjecting the thus-blanking processed reflector structure to bending processing to be, for example, in a shape as shown in FIG. 4 such that a cold cathode ray tube is wrapped. Further, when the blanking processing is performed, the reflector structure may previously be made into cut-sheets having a favorable size. When it becomes necessary to transport the thus-made cut-sheets from the reason that cut-sheet processing, blanking processing and bending processing are separately performed by respective devices and the like, it is preferable that a certain quantity, say, several scores, of cut-sheets are stacked, vacuum packed and, then, transported. On this occasion, it is preferable that a packaging material to be used has a smooth surface from the reason that, when the packaging material having an irregular surface such as an air-cap is used, a minute deformation will be generated on a surface of the cut-sheet to deteriorate characteristics of the lamp reflector.

At the time of performing processing, as shown in a cross-section thereof represented in FIG. 5, it is characterized that the reflector layer 100 comprising the underlying layer (B), the metal layer (C) made primarily of silver and the protective layer (D) is located in an innermost side. On this occasion, such processing as punching and the like may further be optionally added.

Though shapes after bending processing differ from one another depending on applications, a shape of letter "U", a shape of horseshoe substantially defined as a square minus one side or the like is preferable. On this occasion, a curvature radius at the time of processing is 5 mm or less and preferably 4 mm or less.

As specific processing, "V" letter bending processing or "U" letter bending processing by using a press, folding processing by using a tangent bender or the like is mentioned.

Since the reflector according to the invention is excellent in moldability, even when such processing as described above is performed, a wrinkle or an emboss is not generated thereon. From these features, the lamp reflector to be obtained from the reflector according to the invention can realize a beautiful image which has a high luminance and does not generate a luminescent line when the lamp reflector to be obtained by using the reflector according to the invention is arranged in a sidelight-type backlight device.

Examples of light sources to be used include an incandescent lamp, an light emitting diode (LED), an electroluminescence (EL), a fluorescent lamp, a metal halide lamp and the like. Among other things, the fluorescent lamp is favorably used. The fluorescent lamps are broadly classified into two categories in accordance with electrode structure or methods of turning on the light, that is, a hot cathode type and a cold cathode type; on this occasion, there is a tendency in which the hot cathode type allows an electrode and an inverter to be larger in size than the cold cathode type. The hot cathode type is efficient such that a loss of illumination in the vicinity of the electrode which does not contribute to luminescence and is high in an intensity of luminescence such that a luminescence efficiency is excellent to be several times that with the cold cathode type; however, since the cold cathode type is superior to the hot cathode type in duration of service life, the cold cathode type is preferably used from the standpoints of low power consumption, durability and the like compared with the hot cathode type.

As a conductor for supplying electric current to the fluorescent lamp, an ordinary coated lead wire is used; on this occasion, when sulfur is contained in a coating material, since a sulfide such as hydrogen sulfide or the like is generated due to deterioration thereof with time whereupon there is a possibility that the reflective layer or other members may be deteriorated, it is preferable that the conductor using the coating material free of sulfur is used.

In the lamp reflector according to the invention, since the reflective layer in a thin film shape is located in an outermost layer in a side of the light source, light is not confined within a resin as is seen in a type of the reflector protected by a transparent resin and the like. From this reason, even when an intensity of luminance is enhanced, the luminescent line or the like is not generated thereon to realize a beautiful image having a high luminance.

Further, since reflectance is enhanced, an inside temperature can also be lowered whereupon there is an effect that durability is enhanced.

Since the reflector according to the invention is high in reflectance and can obtain a beautiful video, the reflector can also find applications as the lamp reflector in not only a liquid crystal display device, an LED backlight, a projection television set, and a frontlight, but also an underneath-type display device of an PDA, mobile telephone and the like. Further, since the reflector is high in reflectance, the reflector can also be used as a light converging material for a solar cell. In particular, when the reflective film of the reflector of the invention is conductive, taking advantage of this feature, it is able to give the function as electrodes of a minute spherical silicone single crystal solar cell or the like. Examples of other applications thereof include, as a reflector, an electronic flash, signal display, a lamp for a motor vehicle, a fluorescent lamp, and a flashlight which require a light weight and impact resistance, the reflector for chandelier lighting which requires a high quality, and further, in itself, a curved mirror or a rear view mirror.

EXAMPLE

Hereinafter, the invention is specifically described with reference to examples that follow but the invention is by no means limited thereto.

Example 1

Zinc oxide doped with 2% of aluminum oxide was formed on a polyethylene terephthalate (PET) film by a DC magnetron sputtering method using zinc oxide (99.9% purity) doped with 2% of $Al_2O_3$ as a target and an argon gas having a purity of 99.5% as a sputtering gas such that thickness thereof becomes 5 nm to prepare a sheet. Next, without removing the thus-prepared sheet from a sputtering apparatus, silver was formed thereon by the DC magnetron sputtering method in a same manner as in the foregoing zinc oxide by using silver having a purity of 99.9% as a target and an argon gas having a purity of 99.5% as a sputtering gas such that thickness thereof becomes 200 nm. Subsequently, without removing the latter resultant sheet from the sputtering apparatus, zinc oxide doped with 2% of aluminum oxide was formed thereon using zinc oxide (99.9% purity) doped with 2% of $Al_2O_3$ as a target and an argon gas having a purity of 99.5% as a sputtering gas such that thickness thereof becomes 5 nm. When the thus-formed sheet was placed in a Hitachi self-recording spectrophotometer (Type U-3400, available from Hitachi Instruments Service Co., Ltd.) provided with an integrating sphere of 150 $\phi$ and a total reflectance thereof in a side of the reflective layer was measured at 550 nm, the result was 96.3%. Subsequently, a photothermal deterioration test was conducted on this sheet by using a solar simulator (type YSS-505H, available from Yamashita Denso Corporation) under a simulated solar radiation having an irradiation intensity of 500 mW/cm$^2$ as a light source. Further, the reflective sheet was heated up to 100° C. When the reflectance of the sheet was measured after being stood still for 300 hours under these conditions, the reflectance was 95.5%. Furthermore, the reflective sheet as this reflector was laminated with a brass plate having a thickness of 2 mm using a hot melt-type adhesive (Trade name: SK-DYNE 5273, available from Soken Chemical & Engineering Co., Ltd.) by allowing them to be passed through a laminator rollheated at 100° C. After such lamination, when peel strength of the resultant laminate was determined by using a 180 degree peel test, the adhesive strength was 200 g/cm.

Further, the thus-formed reflector in a plate form was molded into a shape (horseshoe shape substantially defined as a square minus one side, width of opening portion: 4 mm) of a lamp reflector for a backlight in a liquid crystal display device and arranged in the device and, thereafter, the device was activated. The luminance of the display was as high as 2350 cd/m$^2$, but a luminescent line was not generated on a screen thereof to obtain a clear image. After 2000 hours and 5000 hours of usage time have passed, the luminance were 2320 cd/m$^2$ and 2300 cd/m$^2$, respectively, and, in both of the above cases, no luminescent line was generated at all. Therefore, there was not found a substantial change with time. The results are shown in Table 1.

Example 2

A reflective sheet and a lamp reflector was prepared in a same manner as in Example 1, except that one surface of the PET film which has been used was subjected to sand mat finishing. Evaluations were conducted thereon.

Reflectance of the reflective sheet before and after the photothermal deterioration test were 96.4% and 95.5%, respectively.

The sheet was laminated with a brass plate by using a same adhesive as in Example 1 with the surface which has been subjected to sand mat finishing being a surface to be laminated. When the peel strength of the resultant laminate was determined by using a 180 degree peel test, the result was 250 g/cm.

After the thus-formed reflector in a plate shape was arranged in the liquid crystal display device, the device was activated. The luminance of the display was as high as 2360 cd/m$^2$, but a luminescent line was not generated on a screen thereof to obtain a clear image. After 2000 hours and 5000 hours of usage time have passed, the luminance were 2340 cd/m$^2$ and 2330 cd/m$^2$, respectively, and, in both of the above cases, no luminescent line was generated at all. Therefore, there was not found a substantial change with time. The results are shown in Table 1.

Example 3

A reflective sheet and a lamp reflector was prepared in a same manner as in Example 1, except that, in the underlying layer and the protective layer, zinc oxide doped with 5% of gallium was used instead of zinc oxide doped with 2% of aluminum oxide and thickness of each of the underlying layer and the protective layer was 7 nm and thickness of the silver layer was 140 nm. Evaluations were conducted thereon.

Reflectance of the reflective sheet before and after the photothermal deterioration test were 96.8% and 96.5%, respectively.

The sheet was laminated with the brass plate in a same manner as in Example 1. When the resultant laminate was measured by a 180 degree peel test, the result was 210 g/cm.

After the thus-formed reflector in a plate shape was arranged in the liquid crystal display device, the device was activated. The luminance of the display was as high as 2380 cd/m$^2$, but a luminescent line was not generated on a screen thereof to obtain a clear image. After 2000 hours and 5000 hours of usage time have passed, the luminance were 2370 cd/m$^2$ and 2360 cd/m$^2$, respectively, and, in both of the above cases, no luminescent line was generated at all. Therefore, there was not found a substantial change with time. The results are shown in Table 1.

Example 4

A reflective sheet and a lamp reflector was prepared in a same manner as in Example 2, except that, in the underlying layer and the protective layer, zinc oxide doped with 5% of gallium was used instead of zinc oxide doped with 2% of aluminum oxide and thickness of each of the underlying layer and the protective layer was 7 nm and the thickness of silver layer was 140 nm. Evaluations were conducted thereon.

Reflectance of the reflective sheet before and after the photothermal deterioration test were 97.0% and 96.5%, respectively.

The sheet was laminated with the brass plate in a same manner as in Example 2. When the resultant laminate was measured by a 180 degree peel test, the result was 250 g/cm.

After the thus-formed reflector in a plate shape was arranged in the liquid crystal display device, the device was activated. The luminance of the display was as high as 2380 cd/m$^2$, but a luminescent line was not generated on a screen thereof to obtain a clear image. After 2000 hours and 5000 hours of usage time have passed, the luminance were 2370 cd/m$^2$ and 2360 cd/m$^2$, respectively, and, in both of the above cases, no luminescent line was generated at all. Therefore, there was not found a substantial change with time. The results are shown in Table 1.

Comparative Example 1

A reflective sheet was prepared in a same manner as in Example 1 except that the reflective layer comprises only a silver layer.

When a reflectance of the obtained sheet was measured, the result was 97.0%. Subsequently, after a same photothermal deterioration test as in Example 1 was performed on the sheet for 300 hours, the reflectance of the thus-treated sheet was measured and found to have been lowered to 40.2%. This shows that a sufficient reflectance as the reflector was no more able to be obtained.

Comparative Example 2

A lamp reflector was prepared in a same manner as in Example 1 except that a reflective layer side of the reflector and a brass plate were laminated with each other. Evaluations were conducted thereon.

When a reflectance of the obtained sheet was measured, the result was 94.6%. Subsequently, after a same photothermal deterioration test as in Example 1 was performed on the sheet for 300 hours, the total reflectance of the thus-treated sheet was measured and found to have been lowered to 53.2%. This shows that a sufficient reflectance as the reflector was no more able to be obtained. It was observed that the sheet was discolored into purple. The results are shown in Table 1.

Example 5

A reflective sheet and a lamp reflector were prepared in a same manner as in Example 4 except that a titanium thin film was formed as the underlying layer. Evaluations were conducted thereon.

Reflectance of the reflective sheet before and after the photothermal deterioration test were 97.2% and 96.8%, respectively.

The sheet was laminated with the brass plate in a same manner as in Example 4. When the resultant laminate was measured by a 180 degree peel test, the result was 250 g/cm.

After the thus-formed reflector in a plate shape was arranged in the liquid crystal display device, the device was activated. The luminance of the display was as high as 2400 cd/m$^2$, but a luminescent line was not generated on a screen thereof to obtain a clear image. After 2000 hours and 5000 hours of usage time have passed, the luminance were 2390 cd/m$^2$ and 2380 cd/m$^2$, respectively, and, in both of the above cases, no luminescent line was generated at all. Therefore, there was not found a substantial change with time. The results are shown in Table 1.

Example 6

A reflective sheet and a lamp reflector were prepared in a same manner as in Example 4 except that a titanium oxide thin film was formed as the underlying layer. Evaluations were conducted thereon.

Reflectance of the reflective sheet before and after the photothermal deterioration test were 96.8% and 96.6%, respectively.

The sheet was laminated with the brass plate in a same manner as in Example 4. When the resultant laminate was measured by a 180 degree peel test, the result was 240 g/cm.

After the thus-formed reflector in a plate shape was arranged in the liquid crystal display device, the device was activated. The luminance of the display was as high as 2380 cd/m$^2$, but a luminescent line was not generated on a screen thereof to obtain a clear image. After 2000 hours and 5000 hours of usage time have passed, the luminance were 2380 cd/m$^2$ and 2350 cd/m$^2$, respectively, and, in both of the above cases, no luminescent line was generated at all. Therefore, there was not found a substantial change with time. The results are shown in Table 1.

Example 7

A reflective sheet and a lamp reflector were prepared in a same manner as in Example 4 except that a tungsten thin film was formed as the underlying layer. Evaluations were conducted thereon.

Reflectance of the reflective sheet before and after the photothermal deterioration test were 96.9% and 96.6%, respectively.

The sheet was laminated with the brass plate in a same manner as in Example 4. When the resultant laminate was measured by a 180 degree peel test, the result was 230 g/cm.

After the thus-formed reflector in a plate shape was arranged in the liquid crystal display device, the device was activated. The luminance of the display was as high as 2390 cd/m$^2$, but a luminescent line was not generated on a screen thereof to obtain a clear image. After 2000 hours and 5000 hours of usage time have passed, the luminance were 2380 cd/m$^2$ and 2360 cd/m$^2$, respectively, and, in both of the above cases, no luminescent line was generated at all. Therefore, there was not found a substantial change with time. The results are shown in Table 1.

Example 8

A reflective sheet and a lamp reflector were prepared in a same manner as in Example 4 except that a copper thin film was formed as the underlying layer. Evaluations were conducted thereon.

Reflectance of the reflective sheet before and after the photothermal deterioration test were 96.8% and 96.7%, respectively.

The sheet was laminated with the brass plate in a same manner as in Example 4. When the resultant laminate was measured by a 180 degree peel test, the result was 240 g/cm.

After the thus-formed reflector in a plate shape was arranged in the liquid crystal display device, the device was activated. The luminance of the display was as high as 2400 cd/m$^2$, but a luminescent line was not generated on a screen thereof to obtain a clear image. After 2000 hours and 5000 hours of usage time have passed, the luminance were 2370 cd/m$^2$ and 2380 cd/m$^2$, respectively, and, in both of the above cases, no luminescent line was generated at all. Therefore, there was not found a substantial change with time. The results are shown in Table 1.

Example 9

A reflective sheet and a lamp reflector were prepared in a same manner as in Example 4 except that a magnesium fluoride thin film was formed as the underlying layer. Evaluations were conducted thereon.

Reflectance of the reflective sheet before and after the photothermal deterioration test were 97.0% and 96.7%, respectively.

The sheet was laminated with the brass plate in a same manner as in Example 4. When the resultant laminate was measured by a 180 degree peel test, the result was 250 g/cm.

After the thus-formed reflector in a plate shape was arranged in the liquid crystal display device, the device was activated. The luminance of the display was as high as 2390 cd/m$^2$, but a luminescent line was not generated on a screen thereof to obtain a clear image. After 2000 hours and 5000 hours of usage time have passed, the luminance were 2390 cd/m$^2$ and 2370 cd/m$^2$, respectively, and, in both of the above cases, no luminescent line was generated at all. Therefore, there was not found a substantial change with time. The results are shown in Table 1.

Example 10

A reflective sheet and a lamp reflector were prepared in a same manner as in Example 4 except that a thin film was formed as the underlying layer by using an indium oxide-tin oxide sintered compact (ITO, component ratio being $In_2O_3$:$SnO_2$=90% by weight: 10% by weight) as a target. Evaluations were conducted thereon.

Reflectance of the reflective sheet before and after the photothermal deterioration test were 97.0% and 96.6%, respectively.

The sheet was laminated with the brass plate in a same manner as in Example 4. When the resultant laminate was measured by a 180 degree peel test, the result was 230 g/cm.

After the thus-formed reflector in a plate shape was arranged in the liquid crystal display device, the device was activated. The luminance of the display was as high as 2390 cd/m$^2$, but a luminescent line was not generated on a screen thereof to obtain a clear image. After 2000 hours and 5000 hours of usage time have passed, the luminance were 2390 cd/m$^2$ and 2370 cd/m$^2$, respectively, and, in both of the above cases, no luminescent line was generated at all. Therefore, there was not found a substantial change with time. The results are shown in Table 1.

Example 11

A reflective sheet and a lamp reflector were prepared in a same manner as in Example 4 except that the protective layer was formed by titanium oxide. Evaluations were conducted thereon.

Reflectance of the reflective sheet before and after the photothermal deterioration test were 96.0% and 95.5%, respectively.

The sheet was laminated with the brass plate in a same manner as in Example 4. When there sultant laminate was measured by a 180 degree peel test, the result was 240 g/cm.

After the thus-formed reflector in a plate shape was arranged in the liquid crystal display device, the device was activated. The luminance of the display was as high as 2290 cd/$m^2$, but a luminescent line was not generated on a screen thereof to obtain a clear image. After 2000 hours and 5000 hours of usage time have passed, the luminance were 2380 cd/$m^2$ and 2380 cd/$m^2$, respectively, and, in both of the above cases, no luminescent line was generated at all. Therefore, there was not found a substantial change with time. The results are shown in Table 1.

Example 12

A reflective sheet and a lamp reflector were prepared in a same manner as in Example 4 except that the protective layer was formed by aluminum oxide. Evaluations were conducted thereon.

Reflectance of the reflective sheet before and after the photothermal deterioration test were 95.6% and 95.2%, respectively.

The sheet was laminated with the brass plate in a same manner as in Example 4. When the resultant laminate was measured by a 180 degree peel test, the result was 240 g/cm.

After the thus-formed reflector in a plate shape was arranged in the liquid crystal display device, the device was activated. The luminance of the display was as high as 2310 cd/$m^2$, but a luminescent line was not generated on a screen thereof to obtain a clear image. After 2000 hours and 5000 hours of usage time have passed, the luminance were 2300 cd/$m^2$ and 2370 cd/$m^2$, respectively, and, in both of the above cases, no luminescent line was generated at all. Therefore, there was not found a substantial change with time. The results are shown in Table 1.

Example 13

A reflective sheet and a lamp reflector were prepared in a same manner as in Example 4 except that the protective layer was formed by silicon oxide. Evaluations were conducted thereon.

Reflectance of the reflective sheet before and after the photothermal deterioration test were 95.5% and 95.0%, respectively.

The sheet was laminated with the brass plate in a same manner as in Example 4. When there sultant laminate was measured by a 180 degree peel test, the result was 250 g/cm.

After the thus-formed reflector in a plate shape was arranged in the liquid crystal display device, the device was activated. The luminance of the display was as high as 2280 cd/$m^2$, but a luminescent line was not generated on a screen thereof to obtain a clear image. After 2000 hours and 5000 hours of usage time have passed, the luminance were 2280 cd/$m^2$ and 2260 cd/$m^2$, respectively, and, in both of the above cases, no luminescent line was generated at all. Therefore, there was not found a substantial change with time. The results are shown in Table 1.

Example 14

A reflective sheet and a lamp reflector were prepared in a same manner as in Example 4 except that an ITO thin film was formed as the protective layer. Evaluations were conducted thereon.

Reflectance of the reflective sheet before and after the photothermal deterioration test were 96.7% and 96.1%, respectively.

The sheet was laminated with the brass plate in a same manner as in Example 4. When the resultant laminate was measured by a 180 degree peel test, the result was 250 g/cm.

After the thus-formed reflector in a plate shape was arranged in the liquid crystal display device, the device was activated. The luminance of the display was as high as 2350 cd/$m^2$, but a luminescent line was not generated on a screen thereof to obtain a clear image. After 2000 hours and 5000 hours of usage time have passed, the luminance were 2340 cd/$m^2$ and 2330 cd/$m^2$, respectively, and, in both of the above cases, no luminescent line was generated at all. Therefore, there was not found a substantial change with time. The results are shown in Table 1.

Example 15

A reflective sheet and a lamp reflector were prepared in a same manner as in Example 4 except that a stainless steel plate was used as the support. Evaluations were conducted thereon.

Reflectance of the reflective sheet before and after the photothermal deterioration test were 96.8% and 96.4%, respectively.

The sheet was laminated with the brass plate in a same manner as in Example 4. When the resultant laminate was measured by a 180 degree peel test, the result was 260 g/cm.

After the thus-formed reflector in a plate shape was arranged in the liquid crystal display device, the device was activated. The luminance of the display was as high as 2390 cd/$m^2$, but a luminescent line was not generated on a screen thereof to obtain a clear image. After 2000 hours and 5000 hours of usage time have passed, the luminance were 2380 cd/$m^2$ and 2350 cd/$m^2$, respectively, and, in both of the above cases, no luminescent line was generated at all. Therefore, there was not found a substantial change with time. The results are shown in Table 1.

Example 16

A reflective sheet and a lamp reflector were prepared in a same manner as in Example 4 except that an aluminum plate was used as the support. Evaluations were conducted thereon.

Reflectance of the reflective sheet before and after the photothermal deterioration test were 96.9% and 96.4%, respectively.

The sheet was laminated with the brass plate in a same manner as in Example 4. When the resultant laminate was measured by a 180 degree peel test, the result was 240 g/cm.

After the thus-formed reflector in a plate shape was arranged in the liquid crystal display device, the device was activated. The luminance of the display was as high as 2390 cd/$m^2$, but a luminescent line was not generated on a screen thereof to obtain a clear image. After 2000 hours and 5000 hours of usage time have passed, the luminance were 2360 cd/$m^2$ and 2340 cd/$m^2$, respectively, and, in both of the above cases, no luminescent line was generated at all. Therefore, there was not found a substantial change with time. The results are shown in Table 1.

Example 17

A reflective sheet and a lamp reflector was prepared in a same manner as in Example 1 except that polycarbonate (bisphenol A type) was used instead of PET. Evaluations were conducted thereon.

Reflectance of the reflective sheet before and after the photothermal deterioration test were 96.1% and 95.5%, respectively.

The sheet was laminated with the brass plate in a same manner as in Example 1. When there sultant laminate was measured by a 180 degree peel test, the result was 250 g/cm.

After the thus-formed reflector in a plate shape was arranged in the liquid crystal display device, the device was activated. The luminance of the display was as high as 2380 cd/$m^2$, but a luminescent line was not generated on a screen thereof to obtain a clear image. After 2000 hours and 5000 hours of usage time have passed, the luminance were 2360 cd/$m^2$ and 2330 cd/$m^2$, respectively, and, in both of the above cases, no luminescent line was generated at all. Therefore, there was not found a substantial change with time. The results are shown in Table 1.

Example 18

A reflective sheet and a lamp reflector was prepared in a same manner as in Example 1 except that nylon was used instead of PET. Evaluations were conducted thereon.

Reflectance of the reflective sheet before and after the photothermal deterioration test were 96.1% and 95.4%, respectively.

The sheet was laminated with the brass plate in a same manner as in Example 1. When the resultant laminate was measured by a 180 degree peel test, the result was 250 g/cm.

After the thus-formed reflector in a plate shape was arranged in the liquid crystal display device, the device was activated. The luminance of the display was as high as 2380 cd/$m^2$, but a luminescent line was not generated on a screen thereof to obtain a clear image. After 2000 hours and 5000 hours of usage time have passed, the luminance were 2360 cd/$m^2$ and 2340 cd/$m^2$, respectively, and, in both of the above cases, no luminescent line was generated at all. Therefore, there was not found a substantial change with time. The results are shown in Table 1.

Example 19

A reflective sheet and a lamp reflector was prepared in a same manner as in Example 1 except that polyvinyl alcohol was used instead of PET. Evaluations were conducted thereon.

Reflectance of the reflective sheet before and after the photothermal deterioration test were 96.3% and 95.7%, respectively.

The sheet was laminated with the brass plate in a same manner as in Example 1. When the resultant laminate was measured by a 180 degree peel test, the result was 240 g/cm.

After the thus-formed reflector in a plate shape was arranged in the liquid crystal display device, the device was activated. The luminance of the display was as high as 2370 cd/$m^2$, but a luminescent line was not generated on a screen thereof to obtain a clear image. After 2000 hours and 5000 hours of usage time have passed, the luminance were 2370 cd/$m^2$ and 2340 cd/$m^2$, respectively, and, in both of the above cases, no luminescent line was generated at all. Therefore, there was not found a substantial change with time. The results are shown in Table 1.

TABLE 1

| | Reflectance (%) Photothermal deterioration test | | Adhesive strength | Luminance (cd/$m^2$) (Presence (Yes) or absence (No) of luminescent line) Usage time | | |
|---|---|---|---|---|---|---|
| | Before | After | (g/cm) | 0 hr | 2000 hr | 5000 hr |
| Example 1 | 96.3 | 95.5 | 200 | 2350 (No) | 2320 (No) | 2300 (No) |
| Example 2 | 96.4 | 95.5 | 250 | 2360 (No) | 2340 (No) | 2330 (No) |
| Example 3 | 96.8 | 96.5 | 210 | 2380 (No) | 2370 (No) | 2360 (No) |
| Example 4 | 97.0 | 96.5 | 250 | 2380 (No) | 2370 (No) | 2360 (No) |
| Comparative Example 1 | 97.0 | 40.2 | — | — | — | — |
| Comparative Example 2 | 94.6 | 53.2 Purple discol-oration | — | — | — | — |
| Example 5 | 97.2 | 96.8 | 250 | 2400 (No) | 2390 (No) | 2380 (No) |
| Example 6 | 96.8 | 96.6 | 240 | 2380 (No) | 2380 (No) | 2350 (No) |
| Example 7 | 96.9 | 96.6 | 230 | 2390 (No) | 2380 (No) | 2360 (No) |
| Example 8 | 96.8 | 96.7 | 240 | 2400 (No) | 2370 (No) | 2380 (No) |
| Example 9 | 97.0 | 96.7 | 250 | 2390 (No) | 2390 (No) | 2370 (No) |
| Example 10 | 97.0 | 96.6 | 230 | 2390 (No) | 2390 (No) | 2370 (No) |
| Example 11 | 96.0 | 95.5 | 240 | 2290 (No) | 2280 (No) | 2280 (No) |
| Example 12 | 95.6 | 95.2 | 240 | 2310 (No) | 2300 (No) | 2270 (No) |
| Example 13 | 95.5 | 95.0 | 250 | 2280 (No) | 2280 (No) | 2260 (No) |
| Example 14 | 96.7 | 96.1 | 250 | 2350 (No) | 2340 (No) | 2330 (No) |
| Example 15 | 96.8 | 96.4 | 260 | 2390 (No) | 2380 (No) | 2350 (No) |
| Example 16 | 96.9 | 96.4 | 240 | 2390 (No) | 2360 (No) | 2340 (No) |

TABLE 1-continued

| | Reflectance (%) Photothermal deterioration test | | Adhesive strength | Luminance (cd/m²) (Presence (Yes) or absence (No) of luminescent line) Usage time | | |
|---|---|---|---|---|---|---|
| | Before | After | (g/cm) | 0 hr | 2000 hr | 5000 hr |
| Example 17 | 96.1 | 95.5 | 250 | 2380 (No) | 2360 (No) | 2330 (No) |
| Example 18 | 96.1 | 95.4 | 250 | 2380 (No) | 2360 (No) | 2340 (No) |
| Example 19 | 96.3 | 95.7 | 240 | 2370 (No) | 2370 (No) | 2340 (No) |

Example 20

A reflective sheet and a lamp reflector was prepared in a same manner as in Example 3 except that thickness of the protective layer was changed into 55 nm. Evaluations were conducted thereon. It was found that moldability of the lamp reflector was a little inferior, though molding processing itself was able to be performed.

Reflectance of the reflective sheet before and after the photothermal deterioration test were 96.3% and 96.0%, respectively.

The sheet was laminated with the brass plate in a same manner as in Example 3. When the resultant laminate was measured by a 180 degree peel test, the result was 260 g/cm.

After the thus-formed reflector in a plate shape was arranged in the liquid crystal display device, the device was activated. The luminance of the display was as high as 2340 cd/m$^2$, but a luminescent line was not generated on a screen thereof to obtain a clear image. After 2000 hours and 5000 hours of usage time have passed, the luminance were 2320 cd/m$^2$ and 2390 cd/m$^2$, respectively, and, in both of the above cases, no luminescent line was generated at all. Therefore, there was not found a substantial change with time. The results are shown in Table 2.

TABLE 2

| | Reflectance (%) Photothermal deterioration test | | Adhesive strength | Luminance (cd/m²) (Presence (Yes) or absence (No) of luminescent line) Usage time | | |
|---|---|---|---|---|---|---|
| | Before | After | (g/cm) | 0 hr | 2000 hr | 5000 hr |
| Example 20 | 96.3 | 96.0 | 260 | 2340 (No) | 2320 (No) | 2290 (No) |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A lamp reflector, comprising a substrate and a reflective layer formed on the substrate, the reflective layer including an underlying layer disposed on a surface of the substrate, a metal layer made primarily of silver and a protective layer consisting essentially of an inorganic substance, the protective layer being directly on the metal layer as the outermost layer, the lamp reflector having a total reflectance of 90% or more at a wavelength of 550 nm after being irradiated from a side of the reflective layer by a simulated solar radiation having an irradiation intensity of 500 mW/cm$^2$ at 100° C. for 300 hours.

2. The lamp reflector of claim 1, wherein the underlying layer is a metal layer comprising a single body of metal selected from the group consisting of: gold, copper, nickel, iron, cobalt, tungsten, molybdenum, tantalum, chromium, indium, manganese, titanium and palladium and/or an alloy made of at least two thereof and having a thickness of from 5 nm to 50 nm and/or a metal salt layer or metal oxide layer having a thickness of from 1 nm to 20 nm.

3. The lamp reflector of claim 1, wherein the metal layer made primarily of silver comprises a single body of silver or an alloy made primarily of silver and has a thickness of from 70 nm to 400 nm.

4. The lamp reflector of claim 1, wherein the protective layer consisting essentially of an inorganic substance is a metal layer consisting essentially of a single body of metal selected from the group consisting of: gold, copper, nickel, iron, cobalt, tungsten, molybdenum, tantalum, chromium, indium, manganese, titanium and palladium and/or an alloy made of at least two thereof and having a thickness of from 5 nm to 50 nm and/or a transparent oxide layer having a thickness of from 1 nm to 20 nm.

5. The lamp reflector of claim 1, wherein a ratio of a sum of thickness of the underlying layer and thickness of the protective layer to thickness of the layer made primarily of silver is 0.005 to 0.3.

6. The lamp reflector of claim 1, wherein a surface of the substrate in a side opposite to the reflective layer has an irregular shape.

7. The lamp reflector of claim 1, wherein the reflector further comprises a support in the form of a plate or sheet made of a polymer or metal.

8. The lamp reflector of claim 1, wherein a curvature radius thereof in a side of the reflective layer is 5 mm or less.

9. A reflector comprising a substrate and a reflective layer formed on the substrate, the reflective layer including an underlying layer disposed on a surface of the substrate, a metal layer made primarily of silver and a protective layer consisting essentially of a transparent oxide, the protective layer being directly on the metal layer as the outermost layer, the reflector having a total reflectance of 90% or more at a wavelength of 550 nm after being subjected from a side of the reflective layer to a simulated solar radiation having an irradiation intensity of 500 mW/cm$^2$ at 100° C. for 300 hours.

10. The reflector of claim 9, wherein a ratio of a sum of thickness of the underlying layer and thickness of the protective layer to thickness of the layer made primarily of silver is 0.005 to 0.3.

11. The reflector of claim 9, wherein the protective layer is a layer of a member selected from the group consisting of: zinc oxide doped with 5% by weight or less of aluminum oxide and zinc oxide doped with 10% by weight or less of gallium, and has a thickness of from 1 nm to 20 nm.

12. A lamp reflector comprising:

a substrate; and a reflective layer formed on the substrate, the reflective layer comprising:

an underlying layer disposed on a surface of the substrate;

a metal layer made primarily of silver; and a protective layer consisting essentially of an inorganic substance directly disposed on the metal layer made primarily of silver; the protective layer being the outermost layer;

wherein the lamp reflector has a total reflectance of 90% or more at a wavelength of 550 nm after being irradiated from a side of the reflective layer by a simulated solar radiation having an irradiation intensity of 500 $mW/cm^2$ at 100° C. for 300 hours.

* * * * *